United States Patent
Brazeau et al.

(10) Patent No.: US 11,758,011 B2
(45) Date of Patent: *Sep. 12, 2023

(54) AUTOMATED ROUTING BASED ON CONTENT METADATA

(71) Applicant: Salesforce, Inc., San Francisco, CA (US)

(72) Inventors: Jeremiah David Brazeau, Hudson, NH (US); Victor Manuel Romero Carrasco, Malaga (ES); Christopher David Boran, Burlington, MA (US); Andre Huss, San Francisco, CA (US); Sergii Sakal, Jena (DE); Tien Duc Le, Jena (DE)

(73) Assignee: Salesforce, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/949,826

(22) Filed: Sep. 21, 2022

(65) Prior Publication Data

US 2023/0042285 A1    Feb. 9, 2023

Related U.S. Application Data

(63) Continuation of application No. 17/224,291, filed on Apr. 7, 2021, now Pat. No. 11,463,543.

(Continued)

(51) Int. Cl.
*H04L 67/51* (2022.01)
*H04L 67/63* (2022.01)

(52) U.S. Cl.
CPC ............. *H04L 67/51* (2022.05); *H04L 67/63* (2022.05)

(58) Field of Classification Search
CPC ................................ H04L 67/51; H04L 67/63
(Continued)

(56) References Cited

U.S. PATENT DOCUMENTS 9,871,850 B1 *  1/2018  Brandwine ............ H04L 67/10
10,382,933 B2 *  8/2019  Pawar ................. H04L 65/1069
(Continued)

FOREIGN PATENT DOCUMENTS

EP    2897340 A1    7/2015
EP    3348038 A1    7/2018

OTHER PUBLICATIONS

International Search Report and Written Opinion for App. No. PCT/US2021/039714, dated Oct. 5, 2021, 14 pages.

(Continued)

*Primary Examiner* — Wing F Chan
*Assistant Examiner* — Leon Y Tseng
(74) *Attorney, Agent, or Firm* — Butzel Long

(57) ABSTRACT

Methods, computer readable media, and devices for automated routing based on content metadata are provided. One method may include receiving a user request for content with metadata from a client by a content distribution network (CDN), parsing the user request for content to generate an evaluation of the metadata, determining a routing decision representing a selection of one of a plurality of origin services for the user request for content based on the evaluation of the metadata, transmitting the user request for content to the selected one of the plurality of origin services based on the routing decision, receiving a response to the user request for content from the selected one of the plurality of origin services, and sending the response to the client.

24 Claims, 4 Drawing Sheets

Related U.S. Application Data

(60) Provisional application No. 63/046,129, filed on Jun. 30, 2020.

(58) Field of Classification Search
USPC .......................................................... 709/243
See application file for complete search history.

(56) References Cited

U.S. PATENT DOCUMENTS

| | | | | |
|---|---|---|---|---|
| 2003/0167234 | A1* | 9/2003 | Bodmer | ............... G06Q 20/382 |
| | | | | 705/51 |
| 2007/0266155 | A1* | 11/2007 | Numata | ................ H04L 65/612 |
| | | | | 709/225 |
| 2012/0209942 | A1 | 8/2012 | Zehavi | |
| 2017/0161391 | A1 | 6/2017 | Li | |
| 2021/0152582 | A1 | 5/2021 | Hwang | |

OTHER PUBLICATIONS

International Preliminary Report on Patentability issued in App. No. PCT/US2021/039714, dated Jan. 12, 2023, 9 pages.

\* cited by examiner

AUTOMATED ROUTING BASED ON CONTENT METADATA

TECHNICAL FIELD

Embodiments disclosed herein relate to techniques and systems for making routing decisions based on metadata associated with an application programming interface (API).

BACKGROUND

Content Delivery Networks (CDNs) typically use geo-proximate domain name services (DNS) to route user requests from the users' browsers and devices through the internet to the geographically closest CDN edge nodes to themselves. The edge nodes typically perform services such as terminating secure socket layer (SSL) requests, maintaining caching for some content, and providing some levels of protection for the origin server such as protection against denial-of-service (DOS) attacks, web application firewall (WAF) protections, and the like. Edge nodes typically maintain longer-lived connections back to the origin server and proxy requests to that server for the real content serving. There may be different CDN configurations for each origin server, configured via DNS. That is, for each origin server, the users may use different DNS entries.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description explain the principles of implementations of the disclosed subject matter. No attempt is made to show structural details in more detail than can be necessary for a fundamental understanding of the disclosed subject matter and various ways in which it can be practiced.

DETAILED DESCRIPTION

Figure 1:
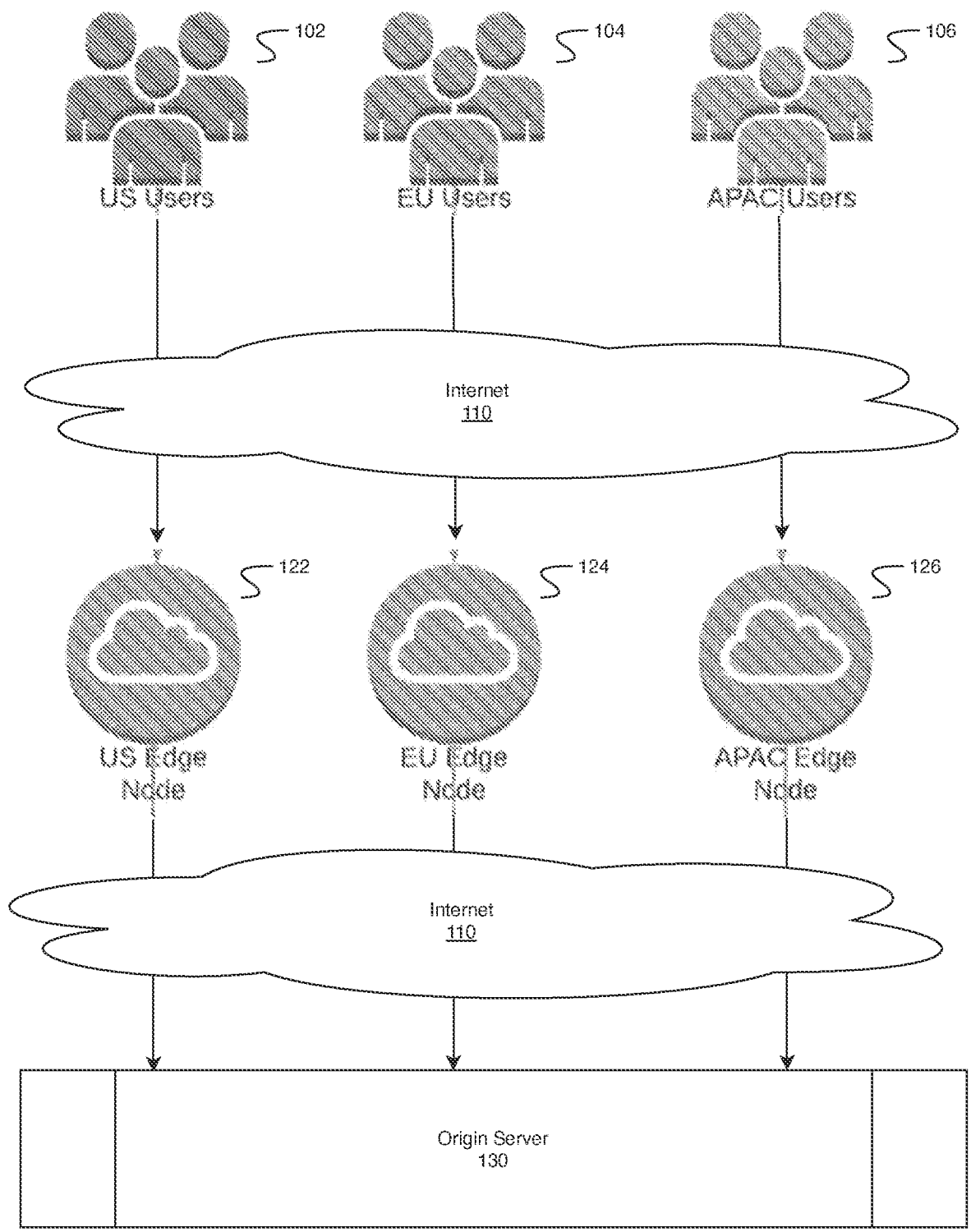
FIG. 1 is a block diagram illustrating a conventional content distribution network (CDN) system according to some example implementations.

Various aspects or features of this disclosure are described with reference to the drawings, wherein like reference numerals are used to refer to like elements throughout. In this specification, numerous details are set forth in order to provide a thorough understanding of this disclosure. It should be understood, however, that certain aspects of disclosure can be practiced without these specific details, or with other methods, components, materials, or the like. In other instances, well-known structures and devices are shown in block diagram form to facilitate describing the subject disclosure.

FIG. 1 shows an example of a conventional content distribution network (CDN) configuration. In this example, users in each geographic region (US users 102, EU users 104, and APAC users 106) access the origin server(s) 130 through the internet 110 via one or more edge nodes (US edge node 122, EU edge node 124, and APAC edge node 126) available to, and configured to serve, their geographic region. For example, US edge node 122 is available to and configured to server US users 102. Similarly, EU edge node 124 is available to and configured to serve EU users 104 while APAC edge node 126 is available to and configured to serve APAC users 106. However, such conventional CDN configuration may not take into account various criteria, such as an intended destination, performance, latency, or the like.

In embodiments of the present disclosure, the CDN edge devices may be used to provide a component of an application programming interface (API) middleware system. Embodiments disclosed herein may provide API caching, routing, and service protection components.

To do so, edge workers may be created that are able to examine metadata, such as instance elements of the uniform resource identifier (URI) path, headers, and/or configuration associated with a user request for content will be delivered via a CDN. In some cases, dynamic elements such as latency may be taken into consideration in order to abstract away the backend systems and perform dynamic routing decisions.

Using such a technique, the same domain name service (DNS) and same edge workers may be used to route to different origin services. For example, based on the URI path elements of a user request that indicate the type of service associated with the request, the request may be automatically routed to the appropriate origin service. Other aspects such as the identity of the tenant wishing to be reached, the latency in communicating to a given service instance, or other metadata may be used to select an appropriate routing.

Once the API requests arrive at a given service, the service may apply other API policies at that level. Embodiments consistent with this approach provide alternative means to perform distributed traffic routing for APIs and thereby avoid funneling all traffic through single points of failure that must be maintained, operated, and scaled. Instead, small function-as-a-service style workers are leveraged at the edge nodes to absorb this scale.

The approach disclosed herein also may allow for web-based services to expose a single endpoint that provides the API surface, so that end users only see one DNS point that can route request to different tenants stored in different technical stacks.

Figure 2:
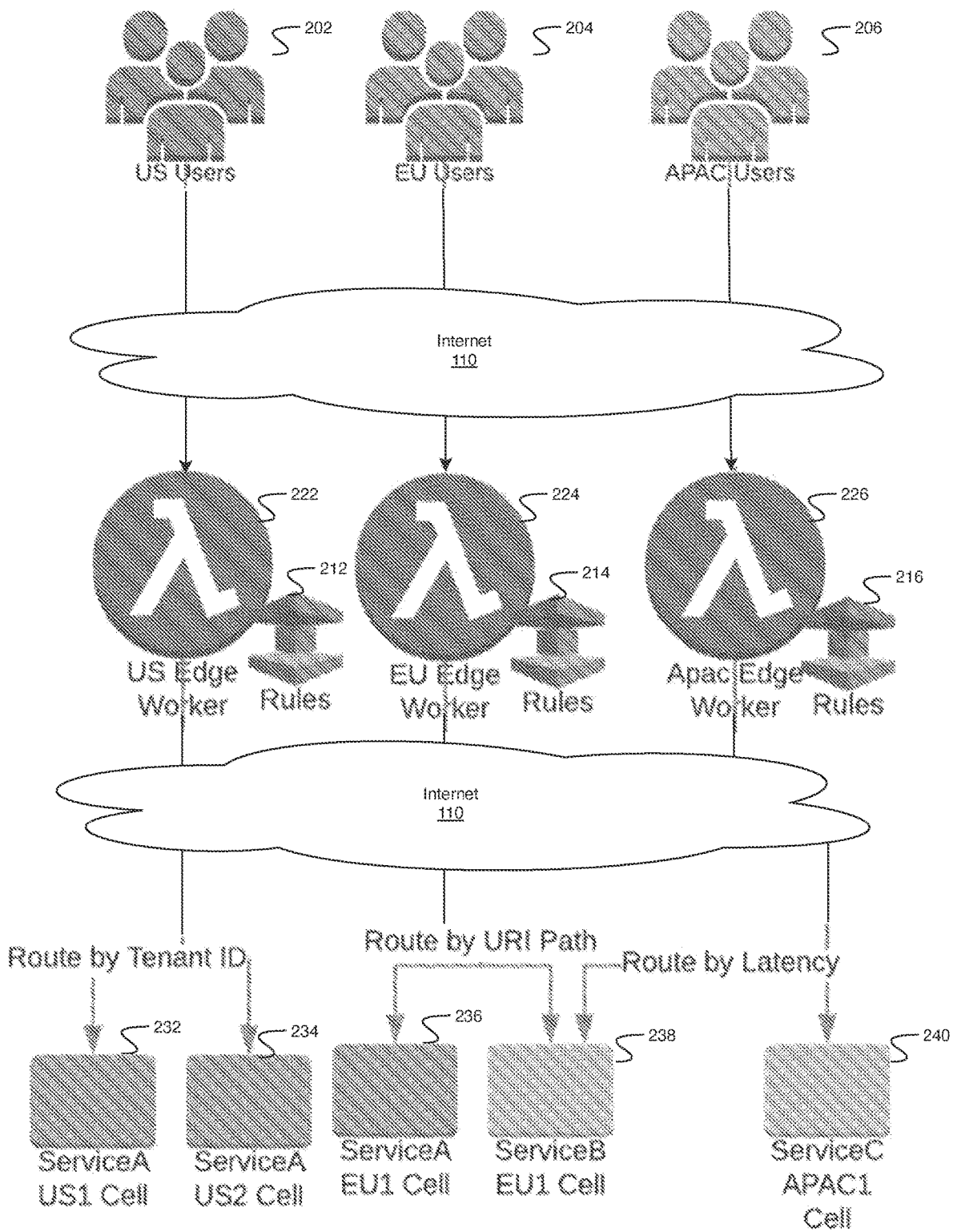
FIG. 2 is a block diagram illustrating a CDN system for routing based on content metadata according to some example implementations.

For example, the edge workers may route and expose different functions depending on whether a user request represents a business-to-business (B2B) or business-to-customer (B2C) login. The end users and end user devices need not access separate sites or services with different URIs depending upon which type of service is needed; rather, the dynamic edge routing process automatically identifies each request as B2B or B2C and routes it to the appropriate origin service, as shown in FIG. 2.

As a specific example, an athletic shoe manufacturer may provide a configuration site that allows users or retailers to customize a shoe for end-user or retailer purchase. The same configuration tool may be provided both on the end-user facing site (B2C) of the manufacturer, as well as a retailer-facing (B2B) using only a single embeddable component with a single API. The user request may be routed appropriately based on metadata in the request.

As another example, a cart/checkout system on an e-commerce site may use different backend origin services than a product display on the same site. It may be desirable to mask the DNS source and technology stack for one or both services. In embodiments disclosed herein, the origin services are effectively hidden behind the end point edge workers and the DNS source at the origin server(s) are not exposed to the end users.

Implementations of the disclosed subject matter provide methods, computer readable media, and devices for automated routing based on content metadata. In various implementations, a method may include receiving, by a content distribution network (CDN), a user request for content including metadata from a client, parsing the user request for content to generate an evaluation of the metadata, determining a routing decision representing a selection of one of a plurality of origin services for the user request for content based on the evaluation of the metadata, transmitting the user request for content to the selected one of the plurality of origin services based on the routing decision, receiving a response to the user request for content from the selected one of the plurality of origin services, and sending, by the CDN, the response to the client.

In some implementations, the user request for content may be an application programming interface (API) call.

In some implementations, the metadata may include one or more elements selected from the group consisting of: a uniform resource identifier (URI) path; a header; a configuration; an identification; a latency; and information associated with a source of the user request for content.

In various implementations, the method may further include caching the response prior to sending the response to the client.

In various implementations, the method may further include receiving a second user request for content including second metadata from the client, parsing the second user request for content to generate a second evaluation of the second metadata, determining a second routing decision for the second user request for content representing a selection of a different one of the plurality of origin services based on the second evaluation of the second metadata, transmitting the second user request for content to the selected different one of the plurality of origin services based on the second routing decision, receiving a second response to the second user request for content from the selected different one of the plurality of origin services, and sending the second response to the client.

In various implementations, the method may further include receiving a second user request for content including second metadata from a second client, parsing the second user request for content to generate a second evaluation of the second metadata, determining a second routing decision for the second user request for content representing a selection of a different one of the plurality of origin services based on the second evaluation of the second metadata, transmitting the second user request for content to the selected different one of the plurality of origin services based on the second routing decision, receiving a second response to the second user request for content from the selected different one of the plurality of origin services, and sending the second response to the client.

FIG. 2 shows an example of a system for performing CDN routing based on request metadata as disclosed herein. As with a conventional CDN system, users in different regions (US users 202, EU users 204, and APAC users 206 in this example) may send requests for various sites or services through the internet 110 to an intended origin site. Each request may be processed by an edge worker, such as US edge worker 222, EU edge worker 224, and APAC edge worker 226, that examines metadata in the request itself, such as a requested URI, requestor information such as login credentials, originating site, or the like, and other metadata associated with the request such as the latency, identification of an associated tenant, or the like. Some metadata may be included in the request or may be otherwise determined depending on the specific implementation. For example, individual requests may include a tenant identifier, or the appropriate tenant may be identified using other techniques.

Based upon this metadata, the receiving edge worker may route the request to an appropriate backend service, such as service A US1 cell 232, service A US2 cell 234, service A EU1 cell 236, service B EU1 cell 238, service C APAC1 cell 240, or the like. Several examples are provided, but it will be understood that, more generally, any request from an end user may be routed to any appropriate backend service or server using the same techniques. Some requests may be sent to different providers of the same service, such as where requests handled by US edge worker 222 may be routed to service A US1 cell 232 or service A US2 cell 234, servers, data centers, or the like depending upon a tenant ID associated with the request. As a specific example, "Service A" may be a customer relationship management application that is used by multiple tenants of a multi-tenant system. Based upon the tenant ID, the request may be routed to the appropriate provider. The tenant ID may be included in the request or may be identified by other means, such as a source IP address, source organization, login credentials of the requesting user, or the like.

As another example, the request may be routed by the URI path included in the request. In this example, two requests from the EU region may be routed to different services (service A EU1 cell 236 and service B EU1 cell 238) based on the URI path in the request.

In still another example, the request may be routed based on latency, such as latency between an edge work and the origin services. In this example, two requests from the APAC region may be routed to different services (service B EU1 cell 238 and service C APAC1 cell 240) based on latency between APAC edge worker 226 and the two services.

In various implementations, each edge worker may reference a set of rules as part of making a routing decision. For example, US edge worker 222 may reference rules 212, EU edge worker 224 may reference rules 214, and APAC edge worker 226 may reference rules 216. As such, an edge worker may base a routing decision on metadata contained in or otherwise associated with a user request as well as rules available to the edge worker.

Figure 3:
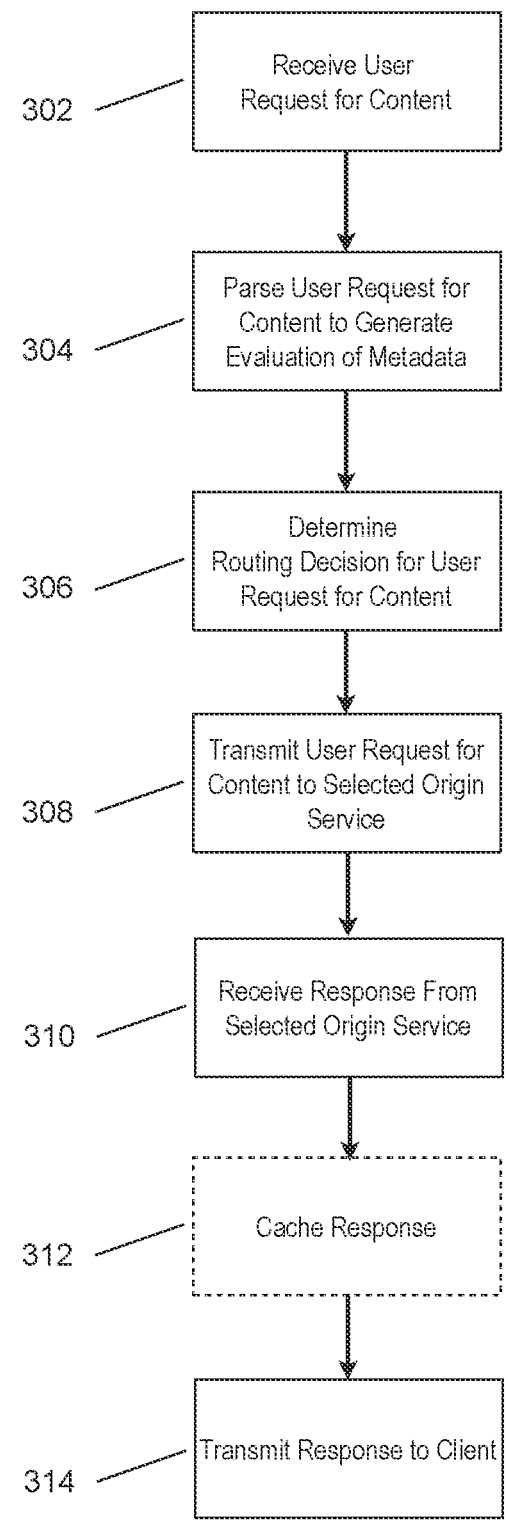
FIG. 3 is a flow diagram illustrating a method for automated routing based on content metadata according to some example implementations.

FIG. 3 illustrates a method 300 for automated routing based on content metadata, as disclosed herein. In various implementations, the steps of method 300 may be performed by a server, such as electronic device 400 of FIG. 4A or system 440 of FIG. 4B, and/or by software executing on a server or distributed computing platform. Although the steps of method 300 are presented in a particular order, this is only for simplicity.

In step 302, a user request for content may be received. For example, an edge worker of a CDN may receive a user request from a client. In various implementations, the user request for content may include metadata, such as a URI path, a header, a configuration, an identification, a latency, information associated with a source of the user request for content, or the like. Such metadata may be included as part of the user request and/or otherwise associated with the user request (e.g., an edge worker may determine a latency between the edge worker and one or more origin services to which the request may be routed). In some implementations, the user request for content may be an API call.

In step 304, the user request for content may be parsed to generate an evaluation of the metadata. For example, an edge worker may parse the metadata to identify one or more criteria on which to base a routing decision.

In step 306, a routing decision for the user request for content may be determined. For example, an edge worker may select one of a plurality of origin services to which the user request will be routed. In various implementations, such routing decision determination may be based on the evaluation of metadata generated in step 304. In some implementations, an edge worker may reference one or more sets of rules as part of the routing decision determination. For example, such rules may define a set of criteria on which an edge worker may base a selection of one of a plurality of origin services. In one example, one such rule may indicate that a primary origin services is to be utilized if latency is below a certain threshold and a secondary origin services is to be utilized if latency is above the threshold.

In step 308, the user request for content may be transmitted to a selected origin service based on the determined routing decision. In step 310, a response from the selected origin service may be received.

In optional step 312, the received response may be cached. For example, the edge worker may cache the response in storage accessible by the edge worker. Such caching may be based, for example, on the rules used to make a routing decision and/or on a configuration of the CDN.

In step 314, the received response may be transmitted to the client. For example, the edge worker may transmit the response to the client from which the user request was received.

As can be seen, automated routing based on content metadata, as described herein, may improve the performance of existing computing systems by enabling better utilization of available resources, such as origin services. In addition, improved protection of critical resources may be achieved by hiding a resource's true identity with a common identity associated with a CDN.

One or more parts of the above implementations may include software. Software is a general term whose meaning can range from part of the code and/or metadata of a single computer program to the entirety of multiple programs. A computer program (also referred to as a program) comprises code and optionally data. Code (sometimes referred to as computer program code or program code) comprises software instructions (also referred to as instructions). Instructions may be executed by hardware to perform operations. Executing software includes executing code, which includes executing instructions. The execution of a program to perform a task involves executing some or all of the instructions in that program.

An electronic device (also referred to as a device, computing device, computer, etc.) includes hardware and software. For example, an electronic device may include a set of one or more processors coupled to one or more machine-readable storage media (e.g., non-volatile memory such as magnetic disks, optical disks, read only memory (ROM), Flash memory, phase change memory, solid state drives (SSDs)) to store code and optionally data. For instance, an electronic device may include non-volatile memory (with slower read/write times) and volatile memory (e.g., dynamic random-access memory (DRAM), static random-access memory (SRAM)). Non-volatile memory persists code/data even when the electronic device is turned off or when power is otherwise removed, and the electronic device copies that part of the code that is to be executed by the set of processors of that electronic device from the non-volatile memory into the volatile memory of that electronic device during operation because volatile memory typically has faster read/write times. As another example, an electronic device may include a non-volatile memory (e.g., phase change memory) that persists code/data when the electronic device has power removed, and that has sufficiently fast read/write times such that, rather than copying the part of the code to be executed into volatile memory, the code/data may be provided directly to the set of processors (e.g., loaded into a cache of the set of processors). In other words, this non-volatile memory operates as both long term storage and main memory, and thus the electronic device may have no or only a small amount of volatile memory for main memory.

In addition to storing code and/or data on machine-readable storage media, typical electronic devices can transmit and/or receive code and/or data over one or more machine-readable transmission media (also called a carrier) (e.g., electrical, optical, radio, acoustical or other forms of propagated signals—such as carrier waves, and/or infrared signals). For instance, typical electronic devices also include a set of one or more physical network interface(s) to establish network connections (to transmit and/or receive code and/or data using propagated signals) with other electronic devices. Thus, an electronic device may store and transmit (internally and/or with other electronic devices over a network) code and/or data with one or more machine-readable media (also referred to as computer-readable media).

Software instructions (also referred to as instructions) are capable of causing (also referred to as operable to cause and configurable to cause) a set of processors to perform operations when the instructions are executed by the set of processors. The phrase "capable of causing" (and synonyms mentioned above) includes various scenarios (or combinations thereof), such as instructions that are always executed versus instructions that may be executed. For example, instructions may be executed: 1) only in certain situations when the larger program is executed (e.g., a condition is fulfilled in the larger program; an event occurs such as a software or hardware interrupt, user input (e.g., a keystroke, a mouse-click, a voice command); a message is published, etc.); or 2) when the instructions are called by another program or part thereof (whether or not executed in the same or a different process, thread, lightweight thread, etc.). These scenarios may or may not require that a larger program, of which the instructions are a part, be currently configured to use those instructions (e.g., may or may not require that a user enables a feature, the feature or instructions be unlocked or enabled, the larger program is configured using data and the program's inherent functionality, etc.). As shown by these exemplary scenarios, "capable of causing" (and synonyms mentioned above) does not require "causing" but the mere capability to cause. While the term "instructions" may be used to refer to the instructions that when executed cause the performance of the operations described herein, the term may or may not also refer to other instructions that a program may include. Thus, instructions, code, program, and software are capable of causing operations when executed, whether the operations are always performed or sometimes performed (e.g., in the scenarios described previously). The phrase "the instructions when executed" refers to at least the instructions that when executed cause the performance of the operations described herein but may or may not refer to the execution of the other instructions.

Electronic devices are designed for and/or used for a variety of purposes, and different terms may reflect those purposes (e.g., user devices, network devices). Some user devices are designed to mainly be operated as servers (sometimes referred to as server devices), while others are designed to mainly be operated as clients (sometimes referred to as client devices, client computing devices, client computers, or end user devices; examples of which include desktops, workstations, laptops, personal digital assistants, smartphones, wearables, augmented reality (AR) devices, virtual reality (VR) devices, mixed reality (MR) devices, etc.). The software executed to operate a user device (typically a server device) as a server may be referred to as server software or server code), while the software executed to operate a user device (typically a client device) as a client may be referred to as client software or client code. A server provides one or more services (also referred to as serves) to one or more clients.

The term "user" refers to an entity (e.g., an individual person) that uses an electronic device. Software and/or services may use credentials to distinguish different accounts associated with the same and/or different users. Users can have one or more roles, such as administrator, programmer/developer, and end user roles. As an administrator, a user typically uses electronic devices to administer them for other users, and thus an administrator often works directly and/or indirectly with server devices and client devices.

Figure 4A:
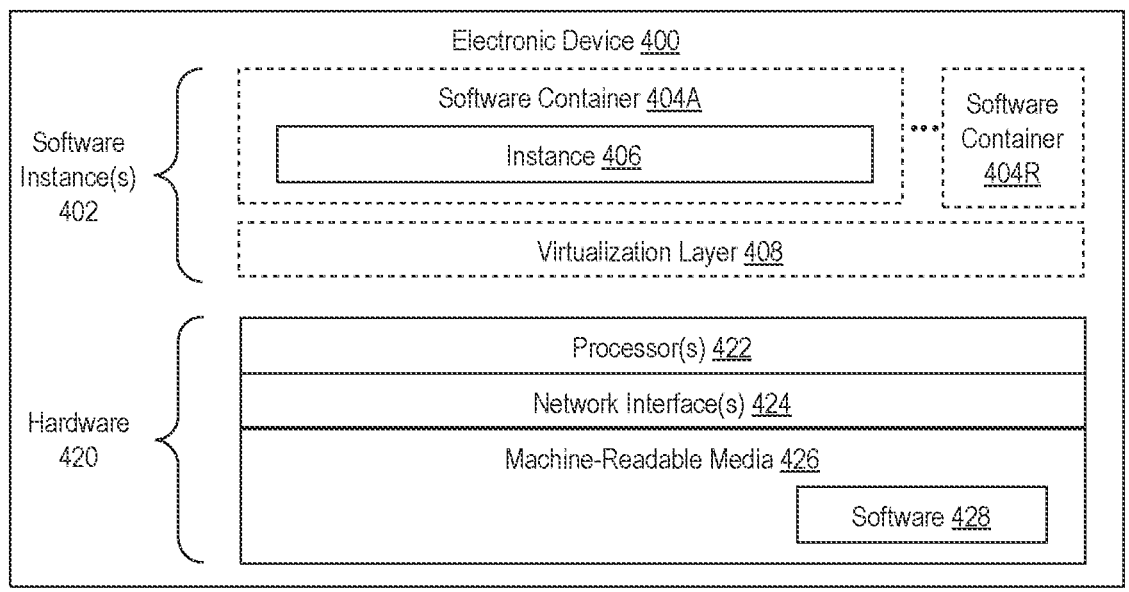
FIG. 4A is a block diagram illustrating an electronic device according to some example implementations.

FIG. 4A is a block diagram illustrating an electronic device 400 according to some example implementations. FIG. 4A includes hardware 420 comprising a set of one or more processor(s) 422, a set of one or more network interfaces 424 (wireless and/or wired), and machine-readable media 426 having stored therein software 428 (which includes instructions executable by the set of one or more processor(s) 422). The machine-readable media 426 may include non-transitory and/or transitory machine-readable media. Each of the previously described clients and consolidated order manager may be implemented in one or more electronic devices 400.

During operation, an instance of the software 428 (illustrated as instance 406 and referred to as a software instance; and in the more specific case of an application, as an application instance) is executed. In electronic devices that use compute virtualization, the set of one or more processor(s) 422 typically execute software to instantiate a virtualization layer 408 and one or more software container(s) 404A-404R (e.g., with operating system-level virtualization, the virtualization layer 408 may represent a container engine running on top of (or integrated into) an operating system, and it allows for the creation of multiple software containers 404A-404R (representing separate user space instances and also called virtualization engines, virtual private servers, or jails) that may each be used to execute a set of one or more applications; with full virtualization, the virtualization layer 408 represents a hypervisor (sometimes referred to as a virtual machine monitor (VMM)) or a hypervisor executing on top of a host operating system, and the software containers 404A-404R each represent a tightly isolated form of a software container called a virtual machine that is run by the hypervisor and may include a guest operating system; with para-virtualization, an operating system and/or application running with a virtual machine may be aware of the presence of virtualization for optimization purposes). Again, in electronic devices where compute virtualization is used, during operation, an instance of the software 428 is executed within the software container 404A on the virtualization layer 408. In electronic devices where compute virtualization is not used, the instance 406 on top of a host operating system is executed on the "bare metal" electronic device 400. The instantiation of the instance 406, as well as the virtualization layer 408 and software containers 404A-404R if implemented, are collectively referred to as software instance(s) 402.

Alternative implementations of an electronic device may have numerous variations from that described above. For example, customized hardware and/or accelerators might also be used in an electronic device.

Figure 4B:
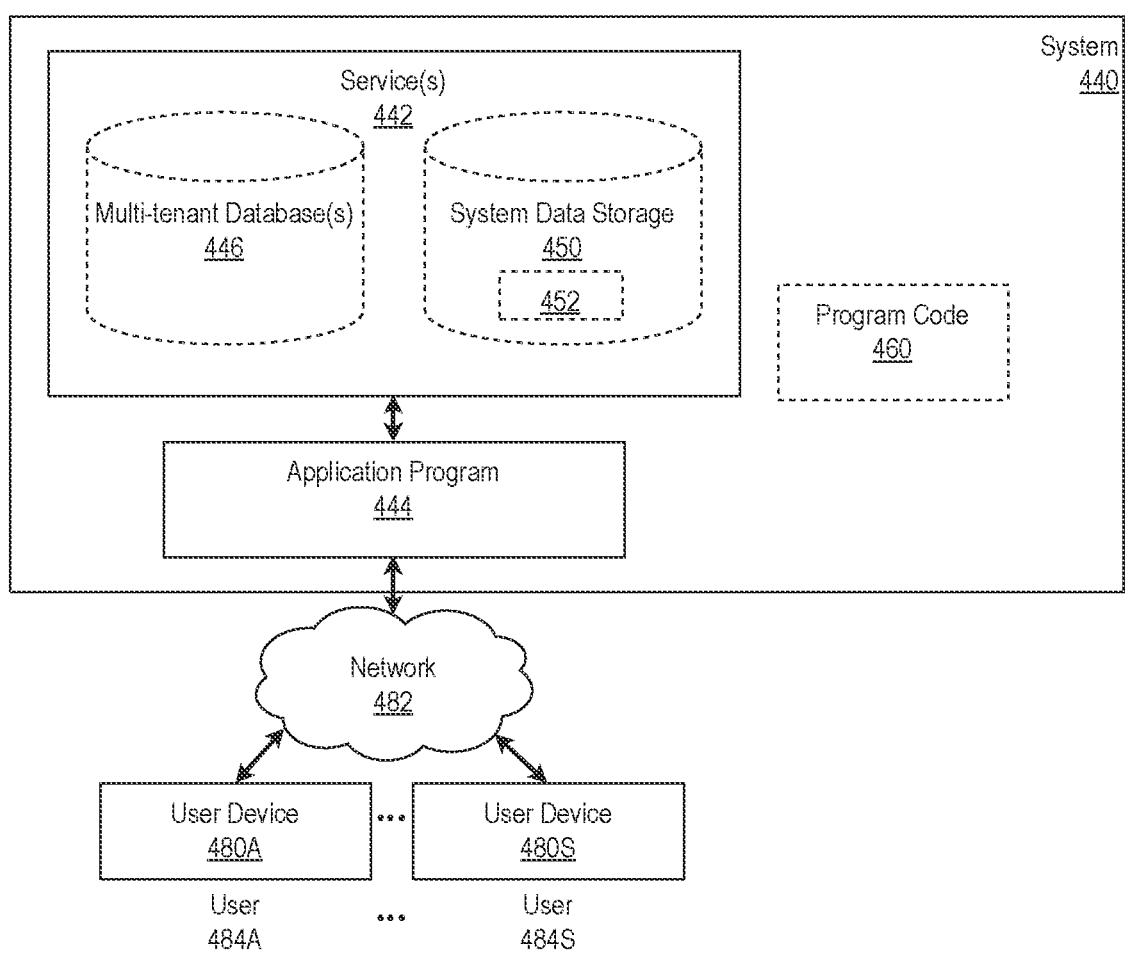
FIG. 4B is a block diagram of a deployment environment according to some example implementations.

FIG. 4B is a block diagram of a deployment environment according to some example implementations. A system 440 includes hardware (e.g., a set of one or more server devices) and software to provide service(s) 442, including a consolidated order manager. In some implementations the system 440 is in one or more datacenter(s). These datacenter(s) may be: 1) first party datacenter(s), which are datacenter(s) owned and/or operated by the same entity that provides and/or operates some or all of the software that provides the service(s) 442; and/or 2) third-party datacenter(s), which are datacenter(s) owned and/or operated by one or more different entities than the entity that provides the service(s) 442 (e.g., the different entities may host some or all of the software provided and/or operated by the entity that provides the service(s) 442). For example, third-party datacenters may be owned and/or operated by entities providing public cloud services.

The system 440 is coupled to user devices 480A-480S over a network 482. The service(s) 442 may be on-demand services that are made available to one or more of the users 484A-484S working for one or more entities other than the entity which owns and/or operates the on-demand services (those users sometimes referred to as outside users) so that those entities need not be concerned with building and/or maintaining a system, but instead may make use of the service(s) 442 when needed (e.g., when needed by the users 484A-484S). The service(s) 442 may communicate with each other and/or with one or more of the user devices 480A-480S via one or more APIs (e.g., a REST API). In some implementations, the user devices 480A-480S are operated by users 484A-484S, and each may be operated as a client device and/or a server device. In some implementations, one or more of the user devices 480A-480S are separate ones of the electronic device 400 or include one or more features of the electronic device 400.

In some implementations, the system 440 is a multi-tenant system (also known as a multi-tenant architecture). The term multi-tenant system refers to a system in which various elements of hardware and/or software of the system may be shared by one or more tenants. A multi-tenant system may be operated by a first entity (sometimes referred to a multi-tenant system provider, operator, or vendor; or simply a provider, operator, or vendor) that provides one or more services to the tenants (in which case the tenants are customers of the operator and sometimes referred to as operator customers). A tenant includes a group of users who share a common access with specific privileges. The tenants may be different entities (e.g., different companies, different departments/divisions of a company, and/or other types of entities), and some or all of these entities may be vendors that sell or otherwise provide products and/or services to their customers (sometimes referred to as tenant customers). A multi-tenant system may allow each tenant to input tenant specific data for user management, tenant-specific functionality, configuration, customizations, non-functional properties, associated applications, etc. A tenant may have one or more roles relative to a system and/or service. For example, in the context of a customer relationship management (CRM) system or service, a tenant may be a vendor using the CRM system or service to manage information the tenant has regarding one or more customers of the vendor. As another example, in the context of Data as a Service (DAAS), one set of tenants may be vendors providing data and another set of tenants may be customers of different ones or all of the vendors' data. As another example, in the context of Platform as a Service (PAAS), one set of tenants may be third-party application developers providing applications/services and another set of tenants may be customers of different ones or all of the third-party application developers.

Multi-tenancy can be implemented in different ways. In some implementations, a multi-tenant architecture may include a single software instance (e.g., a single database instance) which is shared by multiple tenants; other implementations may include a single software instance (e.g., database instance) per tenant; yet other implementations may include a mixed model; e.g., a single software instance (e.g., an application instance) per tenant and another software instance (e.g., database instance) shared by multiple tenants.

In one implementation, the system 440 is a multi-tenant cloud computing architecture supporting multiple services, such as one or more of the following types of services: Customer relationship management (CRM); Configure, price, quote (CPQ); Business process modeling (BPM); Customer support; Marketing; Productivity; Database-as-a-Service; Data-as-a-Service (DAAS or DaaS); Platform-as-a-service (PAAS or PaaS); Infrastructure-as-a-Service (IAAS or IaaS) (e.g., virtual machines, servers, and/or storage); Analytics; Community; Internet-of-Things (IoT); Industry-specific; Artificial intelligence (AI); Application marketplace ("app store"); Data modeling; Security; and Identity and access management (IAM). For example, system 440 may include an application platform 444 that enables PAAS for creating, managing, and executing one or more applications developed by the provider of the application platform 444, users accessing the system 440 via one or more of user devices 480A-480S, or third-party application developers accessing the system 440 via one or more of user devices 480A-480S.

In some implementations, one or more of the service(s) 442 may use one or more multi-tenant databases 446, as well as system data storage 450 for system data 452 accessible to system 440. In certain implementations, the system 440 includes a set of one or more servers that are running on server electronic devices and that are configured to handle requests for any authorized user associated with any tenant (there is no server affinity for a user and/or tenant to a specific server). The user devices 480A-480S communicate with the server(s) of system 440 to request and update tenant-level data and system-level data hosted by system 440, and in response the system 440 (e.g., one or more servers in system 440) automatically may generate one or more Structured Query Language (SQL) statements (e.g., one or more SQL queries) that are designed to access the desired information from the multi-tenant database(s) 446 and/or system data storage 450.

In some implementations, the service(s) 442 are implemented using virtual applications dynamically created at run time responsive to queries from the user devices 480A-480S and in accordance with metadata, including: 1) metadata that describes constructs (e.g., forms, reports, workflows, user access privileges, business logic) that are common to multiple tenants; and/or 2) metadata that is tenant specific and describes tenant specific constructs (e.g., tables, reports, dashboards, interfaces, etc.) and is stored in a multi-tenant database. To that end, the program code 460 may be a runtime engine that materializes application data from the metadata; that is, there is a clear separation of the compiled runtime engine (also known as the system kernel), tenant data, and the metadata, which makes it possible to independently update the system kernel and tenant-specific applications and schemas, with virtually no risk of one affecting the others. Further, in one implementation, the application platform 444 includes an application setup mechanism that supports application developers' creation and management of applications, which may be saved as metadata by save routines. Invocations to such applications, including the framework for modeling heterogeneous feature sets, may be coded using Procedural Language/Structured Object Query Language (PL/SOQL) that provides a programming language style interface. Invocations to applications may be detected by one or more system processes, which manages retrieving application metadata for the tenant making the invocation and executing the metadata as an application in a software container (e.g., a virtual machine).

Network 482 may be any one or any combination of a LAN (local area network), WAN (wide area network), telephone network, wireless network, point-to-point network, star network, token ring network, hub network, or other appropriate configuration. The network may comply with one or more network protocols, including an Institute of Electrical and Electronics Engineers (IEEE) protocol, a 3rd Generation Partnership Project (3GPP) protocol, a $4^{th}$ generation wireless protocol (4G) (e.g., the Long Term Evolution (LTE) standard, LTE Advanced, LTE Advanced Pro), a fifth generation wireless protocol (5G), and/or similar wired and/or wireless protocols, and may include one or more intermediary devices for routing data between the system 440 and the user devices 480A-480S.

Each user device 480A-480S (such as a desktop personal computer, workstation, laptop, Personal Digital Assistant (PDA), smartphone, smartwatch, wearable device, augmented reality (AR) device, virtual reality (VR) device, etc.) typically includes one or more user interface devices, such as a keyboard, a mouse, a trackball, a touch pad, a touch screen, a pen or the like, video or touch free user interfaces, for interacting with a graphical user interface (GUI) provided on a display (e.g., a monitor screen, a liquid crystal display (LCD), a head-up display, a head-mounted display, etc.) in conjunction with pages, forms, applications and other information provided by system 440. For example, the user interface device can be used to access data and applications hosted by system 440, and to perform searches on stored data, and otherwise allow one or more of users 484A-484S to interact with various GUI pages that may be presented to the one or more of users 484A-484S. User devices 480A-480S might communicate with system 440 using TCP/IP (Transfer Control Protocol and Internet Protocol) and, at a higher network level, use other networking protocols to communicate, such as Hypertext Transfer Protocol (HTTP), File Transfer Protocol (FTP), Andrew File System (AFS), Wireless Application Protocol (WAP), Network File System (NFS), an application program interface (API) based upon protocols such as Simple Object Access Protocol (SOAP), Representational State Transfer (REST), etc. In an example where HTTP is used, one or more user devices 480A-480S might include an HTTP client, commonly referred to as a "browser," for sending and receiving HTTP messages to and from server(s) of system 440, thus allowing users 484A-484S of the user devices 480A-480S to access, process and view information, pages and applications available to it from system 440 over network 482.

In the above description, numerous specific details such as resource partitioning/sharing/duplication implementations, types and interrelationships of system components, and logic partitioning/integration choices are set forth in order to provide a more thorough understanding. The invention may be practiced without such specific details, however. In other instances, control structures, logic implementations, opcodes, means to specify operands, and full software instruction sequences have not been shown in detail since those of ordinary skill in the art, with the included descriptions, will be able to implement what is described without undue experimentation.

References in the specification to "one implementation," "an implementation," "an example implementation," etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, and/or characteristic is described in connection with an implementation, one skilled in the art would know to affect such feature, structure, and/or characteristic in connection with other implementations whether or not explicitly described.

For example, the figure(s) illustrating flow diagrams sometimes refer to the figure(s) illustrating block diagrams, and vice versa. Whether or not explicitly described, the alternative implementations discussed with reference to the figure(s) illustrating block diagrams also apply to the implementations discussed with reference to the figure(s) illustrating flow diagrams, and vice versa. At the same time, the scope of this description includes implementations, other than those discussed with reference to the block diagrams, for performing the flow diagrams, and vice versa.

Bracketed text and blocks with dashed borders (e.g., large dashes, small dashes, dot-dash, and dots) may be used herein to illustrate optional operations and/or structures that add additional features to some implementations. However, such notation should not be taken to mean that these are the only options or optional operations, and/or that blocks with solid borders are not optional in certain implementations.

The detailed description and claims may use the term "coupled," along with its derivatives. "Coupled" is used to indicate that two or more elements, which may or may not be in direct physical or electrical contact with each other, co-operate or interact with each other.

While the flow diagrams in the figures show a particular order of operations performed by certain implementations, such order is exemplary and not limiting (e.g., alternative implementations may perform the operations in a different order, combine certain operations, perform certain operations in parallel, overlap performance of certain operations such that they are partially in parallel, etc.).

While the above description includes several example implementations, the invention is not limited to the implementations described and can be practiced with modification and alteration within the spirit and scope of the appended claims. The description is thus illustrative instead of limiting.

What is claimed is:

1. A computer-implemented method for efficient routing based on content metadata, the method comprising:
    receiving, by a first computer system, a user request for content from a client, the user request comprising metadata;
    parsing the user request for content, by the first computer system, to determine an identity of a first user that generated the user request;
    determining, by the first computer system, a routing decision for the user request for content, wherein:
        the routing decision represents a selection of one of a plurality of origin services; and
        the routing decision is based on the identity of the user;
    transmitting the user request for content to the selected one of the plurality of origin services based on the routing decision;
    receiving a response to the user request for content from the selected one of the plurality of origin services; and
    sending the response to the client.

2. The computer-implemented method of claim 1, wherein one or more of the steps of transmitting the user request, receiving the response to the user request, and sending the response to the client are performed by the first computer system.

3. The computer-implemented method of claim 1, wherein the user request for content is an application programming interface (API) call.

4. The computer-implemented method of claim 1, wherein the metadata comprises one or more elements selected from the group consisting of:
    a uniform resource identifier (URI) path;
    a header;
    a configuration;
    an identification;
    a latency; and
    information associated with a source of the user request for content.

5. The computer-implemented method of claim 1, further comprising caching the response prior to sending the response to the client.

6. The computer-implemented method of claim 5, wherein the caching is performed by a content delivery network.

7. The computer-implemented method of claim 1, wherein the user request is a first user request, the method further comprising:
    receiving, by the first computer system, a second user request for content from the client, the second user request different from the first user request and comprising second metadata;
    parsing the second user request for content, by the first computer system, to determine an identity of a second user that generated the second user request;
    determining, by the first computer system, a second routing decision for the second user request for content representing a selection of a different one of the plurality of origin services based on the identity of the second user;
    transmitting the second user request for content to the selected different one of the plurality of origin services based on the second routing decision;
    receiving a second response to the second user request for content from the selected different one of the plurality of origin services; and
    sending the second response to the client.

8. The computer-implemented method of claim 7, wherein one or more of the steps of transmitting the second user request, receiving the second response, and sending the second response to the client are performed by the first computer system.

9. The computer-implemented method of claim 1, wherein the client is a first client, the method further comprising:
  receiving, by the first computer system, a second user request for content from a second client different from the first client, the second user request comprising second metadata;
  parsing the second user request for content, by the first computer system, to determine an identity of a second user that generated the second user request;
  determining, by the first computer system, a second routing decision for the second user request for content representing a selection of a different one of the plurality of origin services based on the identity of the second user;
  transmitting, by the first computer system, the second user request for content to the selected different one of the plurality of origin services based on the second routing decision;
  receiving, by the first computer system, a second response to the second user request for content from the selected different one of the plurality of origin services; and
  sending, by the first computer system, the second response to the second client.

10. The computer-implemented method of claim 1, wherein the first computer system is a content delivery network.

11. A non-transitory machine-readable storage medium that provides instructions that, if executed by a processor, are configurable to cause the processor to perform operations comprising:
  receiving, by a first computer system, a user request for content from a client, the user request comprising metadata;
  parsing the user request for content, by the first computer system, to determine an identity of a first user that generated the user request;
  determining, by the first computer system, a routing decision for the user request for content, wherein:
    the routing decision represents a selection of one of a plurality of origin services; and
    the routing decision is based on the identity of the user;
  transmitting the user request for content to the selected one of the plurality of origin services based on the routing decision;
  receiving a response to the user request for content from the selected one of the plurality of origin services; and
  sending the response to the client.

12. The non-transitory machine-readable storage medium of claim 11, wherein the user request for content is an application programming interface (API) call.

13. The non-transitory machine-readable storage medium of claim 11, wherein the metadata comprises one or more elements selected from the group consisting of:
  a uniform resource identifier (URI) path;
  a header;
  a configuration;
  an identification;
  a latency; and
  information associated with a source of the user request for content.

14. The non-transitory machine-readable storage medium of claim 11, wherein the operations further comprise caching the response prior to sending the response to the client.

15. The computer-implemented method of claim 14, wherein the caching is performed by a content delivery network.

16. The non-transitory machine-readable storage medium of claim 11, wherein the user request is a first user request, and wherein the operations further comprise:
  receiving, by the first computer system, a second user request for content from the client, the second user request different from the first user request and comprising second metadata;
  parsing the second user request for content, by the first computer system, to determine an identity of a second user that generated the second user request;
  determining, by the first computer system, a second routing decision for the second user request for content representing a selection of a different one of the plurality of origin services based on the identity of the second user;
  transmitting the second user request for content to the selected different one of the plurality of origin services based on the second routing decision;
  receiving a second response to the second user request for content from the selected different one of the plurality of origin services; and
  sending the second response to the client.

17. The non-transitory machine-readable storage medium of claim 11, wherein the client is a first client, and wherein the operations further comprise:
  receiving, by the first computer system, a second user request for content from a second client different from the first client, the second user request comprising second metadata;
  parsing the second user request for content, by the first computer system, to determine an identity of a second user that generated the second user request;
  determining, by the first computer system, a second routing decision for the second user request for content representing a selection of a different one of the plurality of origin services based on the identity of the second user;
  transmitting the second user request for content to the selected different one of the plurality of origin services based on the second routing decision;
  receiving a second response to the second user request for content from the selected different one of the plurality of origin services; and
  sending the second response to the second client.

18. An apparatus comprising:
  a processor; and
  a non-transitory machine-readable storage medium that provides instructions that, if executed by a processor, are configurable to cause the processor to perform operations comprising:
    receiving, by a first computer system, a user request for content from a client, the user request comprising metadata;
    parsing the user request for content, by the first computer system, to determine an identity of a first user that generated the user request;
    determining, by the first computer system, a routing decision for the user request for content, wherein:
      the routing decision represents a selection of one of a plurality of origin services; and the routing decision is based on the identity of the user;

transmitting, by the first computer system, the user request for content to the selected one of the plurality of origin services based on the routing decision;

receiving, by the first computer system, a response to the user request for content from the selected one of the plurality of origin services; and sending, by the first computer system, the response to the client.

19. The apparatus of claim 18, wherein the user request for content is an application programming interface (API) call.

20. The apparatus of claim 18, wherein the metadata comprises one or more elements selected from the group consisting of:

a uniform resource identifier (URI) path;
a header;
a configuration;
an identification;
a latency; and
information associated with a source of the user request for content.

21. The apparatus of claim 18, wherein the operations further comprise caching, by the first computer system, the response prior to sending the response to the client.

22. The computer-implemented method of claim 21, wherein the caching is performed by a content delivery network.

23. The apparatus of claim 18, wherein the user request is a first user request, and wherein the operations further comprise:

receiving, by the first computer system, a second user request for content from the client, the second user request different from the first user request and comprising second metadata;

parsing the second user request for content, by the first computer system, to determine an identity of a second user that generated the second user request;

determining, by the first computer system, a second routing decision for the second user request for content representing a selection of a different one of the plurality of origin services based on the identity of the second user;

transmitting the second user request for content to the selected different one of the plurality of origin services based on the second routing decision;

receiving a second response to the second user request for content from the selected different one of the plurality of origin services; and sending the second response to the client.

24. The apparatus of claim 18, wherein the client is a first client and wherein the operations further comprise:

receiving, by the first computer system, a second user request for content from a second client different from the first client, the second user request comprising second metadata;

parsing the second user request for content, by the first computer system, to determine an identity of a second user that generated the second user request;

determining, by the first computer system, a second routing decision for the second user request for content representing a selection of a different one of the plurality of origin services based on the identity of the second user;

transmitting the second user request for content to the selected different one of the plurality of origin services based on the second routing decision;

receiving a second response to the second user request for content from the selected different one of the plurality of origin services; and sending the second response to the second client.

* * * * *